(12) United States Patent
Cormier et al.

(10) Patent No.: US 11,668,253 B2
(45) Date of Patent: Jun. 6, 2023

(54) SYSTEM AND METHOD FOR PROVIDING IN-FLIGHT REVERSE THRUST FOR AN AIRCRAFT

(71) Applicant: PRATT & WHITNEY CANADA CORP., Longueuil (CA)

(72) Inventors: Charles Cormier, Sainte-Julie (CA); Daniel Coutu, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 160 days.

(21) Appl. No.: 17/072,477

(22) Filed: Oct. 16, 2020

(65) Prior Publication Data
US 2022/0120224 A1 Apr. 21, 2022

(51) Int. Cl.
*F02C 9/22* (2006.01)
*F01D 7/00* (2006.01)
*F02C 9/58* (2006.01)
*F02K 1/66* (2006.01)

(52) U.S. Cl.
CPC .................. *F02C 9/22* (2013.01); *F01D 7/00* (2013.01); *F02C 9/58* (2013.01); *F02K 1/66* (2013.01); *F05D 2220/323* (2013.01); *F05D 2240/12* (2013.01); *F05D 2270/051* (2013.01); *F05D 2270/304* (2013.01)

(58) Field of Classification Search
CPC ...... F02C 9/22; F02C 9/58; F02K 1/66; F01D 7/00
See application file for complete search history.

(56) References Cited

U.S. PATENT DOCUMENTS

| 2,737,018 | A | * | 3/1956 | Bain | ..................... | B64D 35/00 |
| | | | | | | 416/169 R |
| 3,946,554 | A | | 3/1976 | Neumann | | |
| 4,446,696 | A | | 5/1984 | Sargisson et al. | | |
| 6,672,835 | B1 | | 1/2004 | Hugues | | |
| 7,775,044 | B2 | | 8/2010 | Julien et al. | | |
| | | | | (Continued) | | |

FOREIGN PATENT DOCUMENTS

| EP | 3023617 | | 5/2016 | | |
| EP | 3023617 | A1 * | 5/2016 | ............. | F01D 15/12 |

(Continued)

*Primary Examiner* — Craig Kim
(74) *Attorney, Agent, or Firm* — Norton Rose Fulbright Canada LLP

(57) ABSTRACT

A method and a system for providing in-flight reverse thrust for an aircraft are provided. The aircraft comprises an engine having a rotor, a compressor mechanically coupled to the rotor, and a variable geometry mechanism provided upstream of the compressor and configured to modulate an amount of compression work performed by the compressor. The method comprises operating the rotor with the variable geometry mechanism in a first position, receiving a request to increase reverse thrust for the rotor, in response to the request, adjusting the variable geometry mechanism from the first position towards a second position, the variable geometry mechanism having a greater opening angle in the second position than in the first position, and operating the rotor with the variable geometry mechanism in the second position for causing an increase in the amount of compression work performed by the compressor and an increase in reverse thrust for the rotor.

16 Claims, 11 Drawing Sheets

(56) References Cited

U.S. PATENT DOCUMENTS

| | | |
|---|---|---|
| 9,835,044 B2 | 12/2017 | Lecordix |
| 10,227,931 B2 | 3/2019 | Stockwell |
| 10,487,682 B2 | 11/2019 | Duke et al. |
| 10,961,921 B2* | 3/2021 | Tang .................. B64C 11/301 |
| 11,041,443 B2* | 6/2021 | Durocher ................ F02C 6/206 |
| 2010/0083632 A1* | 4/2010 | Foster .................... F01D 15/10 |
| | | 60/39.181 |
| 2010/0083669 A1* | 4/2010 | Foster .................... F02C 6/206 |
| | | 60/802 |
| 2010/0108806 A1* | 5/2010 | Chan ........................ F02C 6/18 |
| | | 244/1 N |
| 2010/0126178 A1* | 5/2010 | Hyde ..................... B64D 27/24 |
| | | 60/645 |
| 2014/0223916 A1* | 8/2014 | Wehmeier ............. F02K 1/1207 |
| | | 60/39.23 |
| 2015/0013306 A1* | 1/2015 | Shelley ..................... F02K 5/00 |
| | | 60/224 |
| 2016/0332741 A1* | 11/2016 | Moxon .................. B64C 21/00 |
| 2017/0226960 A1* | 8/2017 | Nakano ..................... F02K 1/64 |
| 2018/0045071 A1* | 2/2018 | Roach ....................... G01L 5/00 |
| 2018/0363481 A1* | 12/2018 | Bailey .................. F04D 29/362 |
| 2019/0055901 A1* | 2/2019 | Lamarre ................... F02C 9/44 |
| 2020/0083791 A1* | 3/2020 | Latulipe ................. G08C 19/38 |
| 2020/0088112 A1* | 3/2020 | Tang .................... B64C 11/303 |
| 2020/0298959 A1* | 9/2020 | Castellani ............... F01D 5/021 |
| 2021/0108597 A1* | 4/2021 | Ostdiek .................. F02C 3/067 |
| 2022/0120224 A1* | 4/2022 | Cormier .................. F01D 7/00 |
| 2022/0135196 A1* | 5/2022 | Morvillo ................ B63H 21/21 |
| | | 440/84 |

FOREIGN PATENT DOCUMENTS

| | | | |
|---|---|---|---|
| EP | 3640133 | 4/2020 | |
| EP | 3985239 A1 * | 4/2022 | ............... F01D 7/00 |
| GB | 828858 A | 2/1960 | |

* cited by examiner

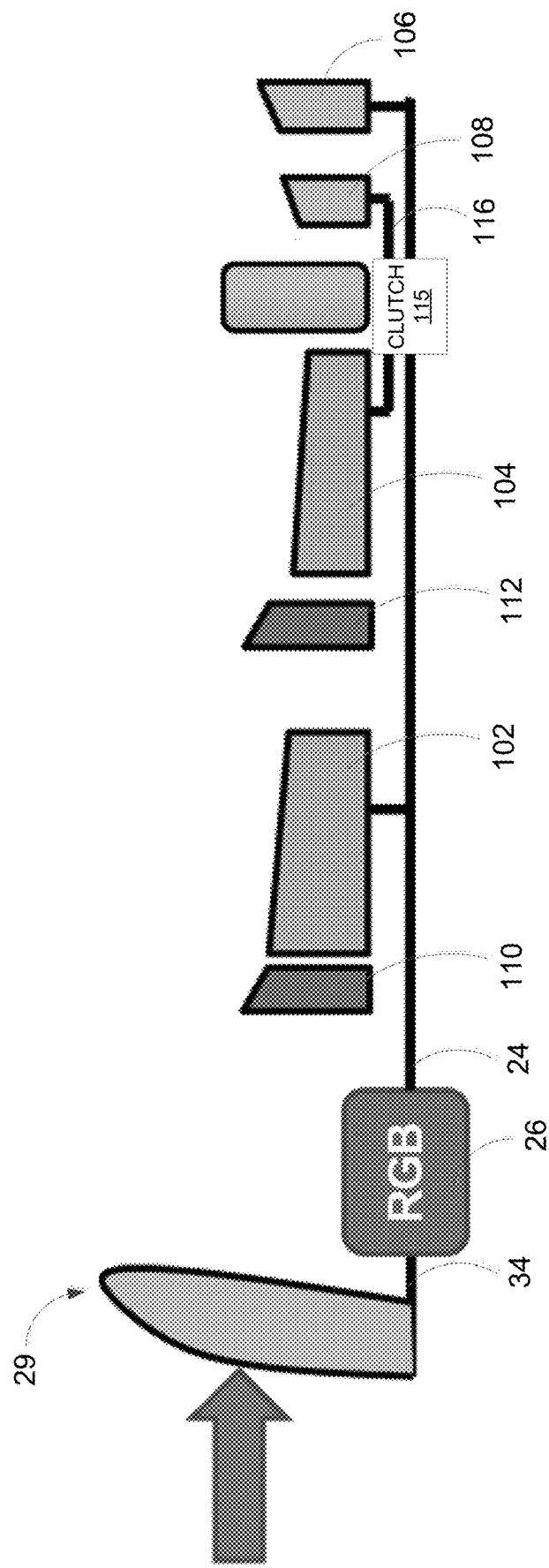

SYSTEM AND METHOD FOR PROVIDING IN-FLIGHT REVERSE THRUST FOR AN AIRCRAFT

TECHNICAL FIELD

The application relates generally to aircraft control and, more particularly, to providing in-flight reverse thrust for an aircraft.

BACKGROUND OF THE ART

Constant speed propellers are controlled by varying the blade angles to maintain the speed of the propeller at a reference speed. In order to do so, the blade angle is increased with increasing power and increasing aircraft speed. The blade angle is decreased with decreasing aircraft speed and decreasing aircraft power. During aircraft descent, the blade angle of a propeller is typically reduced in order to maintain constant speed with the engine power and aircraft speed used for descent. This causes the propeller to be partially or entirely driven by the speed of the aircraft. The operating zone known as "windmilling" is reached when the propeller is entirely driven by the speed of the aircraft. In that state, the propeller is providing reverse thrust. However, other measures are required in order to increase the reverse thrust and slow down the aircraft.

Therefore, improvements are needed.

SUMMARY

In one aspect, there is provided a method for providing in-flight reverse thrust for an aircraft. The aircraft comprises an engine having a rotor, a compressor mechanically coupled to the rotor, and a variable geometry mechanism provided upstream of the compressor and configured to modulate an amount of compression work performed by the compressor. The method comprises operating the rotor with the variable geometry mechanism in a first position, receiving a request to increase reverse thrust for the rotor, in response to the request, adjusting the variable geometry mechanism from the first position towards a second position, the variable geometry mechanism having a greater opening angle in the second position than in the first position, and operating the rotor with the variable geometry mechanism in the second position for causing an increase in the amount of compression work performed by the compressor and an increase in reverse thrust for the rotor.

In another aspect, there is provided a system for providing in-flight reverse thrust for an aircraft. The aircraft comprises an engine having a rotor, a compressor mechanically coupled to the rotor, and a variable geometry mechanism provided upstream of the compressor and configured to modulate an amount of compression work performed by the compressor. The system comprises at least one processing unit, and at least one non-transitory computer-readable memory having stored thereon program instructions executable by the processing unit for operating the rotor with the variable geometry mechanism in a first position, receiving a request to increase reverse thrust for the rotor, in response to the request, adjusting the variable geometry mechanism from the first position towards a second position, the variable geometry mechanism having a greater opening angle in the second position than in the first position, and operating the rotor with the variable geometry mechanism in the second position for causing an increase in the amount of compression work performed by the compressor and an increase in reverse thrust for the rotor.

In a further aspect, there is provided a computer readable medium having stored thereon program code executable by a processor for providing in-flight reverse thrust for an aircraft engine having a rotor, a compressor mechanically coupled to the rotor, and a variable geometry mechanism provided upstream of the compressor and configured to modulate an amount of compression work performed by the compressor. The program code comprising instructions for operating the rotor with the variable geometry mechanism in a first position, receiving a request to increase reverse thrust for the engine, in response to the request, adjusting the variable geometry mechanism from the first position towards a second position, the variable geometry mechanism having a greater opening angle in the second position than in the first position, and operating the rotor with the variable geometry mechanism in the second position for causing an increase in the amount of compression work performed by the compressor and an increase in reverse thrust for the engine.

DESCRIPTION OF THE DRAWINGS

Reference is now made to the accompanying figures in which:

FIG. 1C is a schematic diagram illustrating the architecture of the gas turbine engine of FIG. 1A, in accordance with another illustrative embodiment;

It will be noted that throughout the appended drawings, like features are identified by like reference numerals.

DETAILED DESCRIPTION

There is described herein systems and methods for providing reverse thrust for an aircraft in certain flight phases.

Figure 1A:
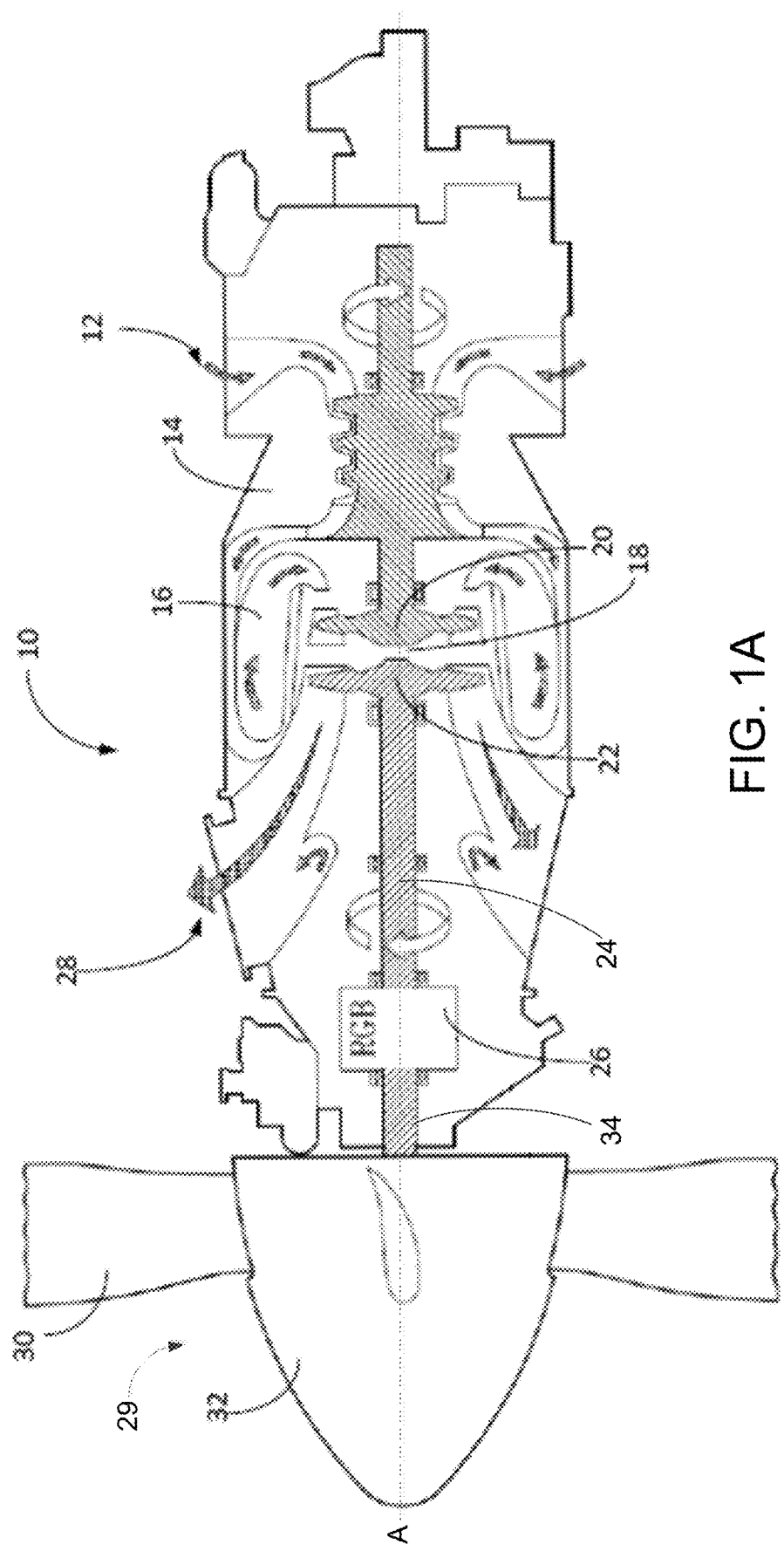
FIG. 1A is a schematic cross-sectional view of a gas turbine engine, in accordance with an illustrative embodiment.

The aircraft is equipped with an engine, such as a turboprop engine having a propeller. FIG. 1A illustrates an exemplary gas turbine engine 10 of a type preferably provided for use in subsonic flight, generally comprising in serial flow communication an inlet 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 illustratively comprises a compressor turbine 20, which drives the compressor assembly and accessories, and at least one power or free turbine 22, which is independent from the compressor turbine 20 and drives a power turbine shaft 24. Hot gases may then be evacuated through exhaust stubs 28. Other configurations for a free turbine turboprop engine 10 may also apply.

A propeller 29 through which ambient air is propelled, is composed of a propeller hub 32 and blades 30. The propeller 29 converts rotary motion from the engine 10 to provide propulsive force to the aircraft. The propeller 29 is mechanically coupled to a reduction gearbox (RGB) 26 via a propeller shaft 34, which rotates at a given speed ratio relative to the power turbine shaft 24. As will be discussed further below, in one embodiment, propeller 29 is a constant speed propeller, meaning that it is designed to automatically change its blade angle (or blade pitch) to allow it to maintain a constant rotational speed (also referred to herein as a "reference speed"), regardless of the amount of engine torque being produced, the speed of the aircraft, or the altitude at which the aircraft is flying.

As the propeller 29 is rotated, it generates propeller thrust. The propeller thrust depends on the propeller blade angle. Rotation of the propeller 29 in the air creates drag, which is counteracted by engine torque. A small portion of the total torque is due to losses in the engine gearbox 26 and bearings (not shown). When thrust is positive, it results in a forward force on the propeller 29. When thrust is negative (also referred to herein as "reverse thrust"), it results in a backward (or braking) force on the propeller 29. As used herein, the term "propeller drag" refers to the resistance of the propeller 29 to rotation. Propeller drag is produced by the propeller blades 30, and is reduced by decreasing the blade angle. As used herein, the term "aircraft drag" refers to the aerodynamic force that opposes the aircraft's motion through the air.

As will be discussed further below, the systems and methods described herein may be used to reduce propeller speed and thrust during descent. The systems and methods described herein may be applied to a turboprop engine having either a variable pitch propeller or a fixed pitch propeller. The systems and methods described herein may be applied to aircraft having single or multiple (i.e., two or more) turboprop engines. It should also be understood that, although illustrated as a turboprop engine, the gas turbine engine 10 may alternatively be another type of engine, for example a turbofan engine, also generally comprising in serial flow communication a compressor section, a combustor, and a turbine section, and a fan through which ambient air is propelled. The systems and methods described herein may therefore be applied to a turbofan engine to further reduce fan speed and thrust during descent. The turbofan engine may have a fan presenting either a variable pitch angle or a fixed pitch angle. As used herein, the term "rotor" therefore refers to the propeller of a turboprop engine or the fan of a turbofan engine.

Figure 1B:
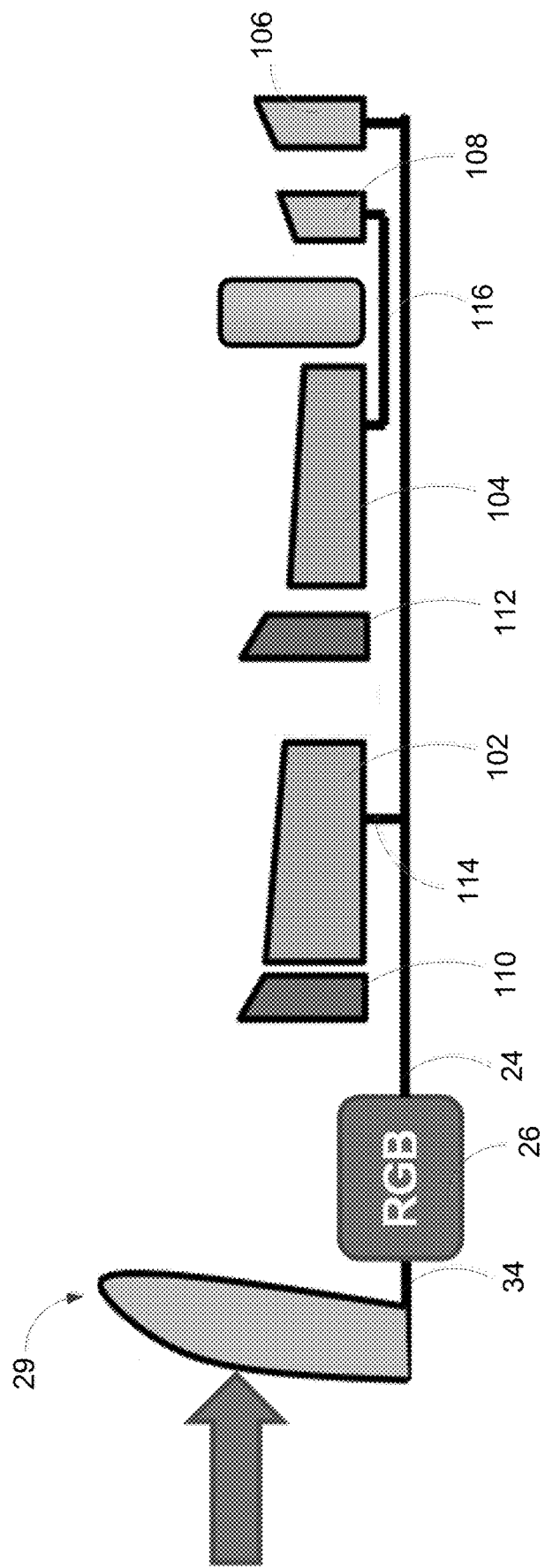
FIG. 1B is a schematic diagram illustrating the architecture of the gas turbine engine of FIG. 1A, in accordance with an illustrative embodiment.

Referring now to FIG. 1B in addition to FIG. 1A, the architecture of the engine 10 will now be described, in accordance with one embodiment. The compressor section 14 comprises a low pressure compressor (LPC) 102 and a high pressure compressor (HPC) 104. The turbine section 18 comprises a low pressure turbine (LPT) 106 and a high pressure turbine (HPT) 108. As used herein, a "high pressure" compressor or turbine experiences a higher pressure than a corresponding "low pressure" compressor or turbine. The LPC 102, LPT 106, HPC 104, and HPT 108 may include one or more stages of axial rotary components, depending upon the desired engine thermodynamic cycle, for example.

The LPT 106 extracts energy from the combustion gases (referred to above in reference to FIG. 1A) and is drivingly engaged to the LPC 102 for pressurizing the air. The LPT 106 (also referred to as a "power turbine") drives the LPC 102, thereby causing the LPC 102 to pressurize the air receive through the engine's air inlet. In the depicted embodiment, both the LPT 106 and the LPC 102 are axial rotatable components having a shaft axis (not shown) that is coaxial with the engine's central axis (reference A in FIG. 1A). The power turbine shaft 24 mechanically couples the LPT 106 and the LPC 102, and extends axially between them, along the central axis A. The power turbine shaft 24 allows the LPT 106 to drive the LPC 102 during operation of the engine 10.

The HPT 108 is drivingly engaged (e.g. directly connected) to the HPC 104 by an HP shaft 116 that rotates independently from the power turbine shaft 24. During operation of the engine 10, the HPT 108 drives the HPC 104. In the depicted embodiment, both the HPT 108 and the HPC 104 are axial rotatable components having a shaft axis (not shown) that is coaxial with the central axis A.

The engine 10 further comprises a variable geometry mechanism (VGM). In the embodiment of FIG. 1B, the VGM comprises a set of one or more Variable Inlet Guide Vanes (VIGVs) 110 used on the LPC 102 and a set of one or more Variable Guide Vanes (VGVs) 112 provided at the entry of the HPC 104. The VIGV(s) 110 are used to direct air into the LPC 102 and modulate the amount of compression work performed by the LPC 102. The VGV(s) 112 are configured to direct air out of the LPC 102 and into the HPC 104.

In order to enable for reverse thrust to be increased, it is proposed herein to use the compression work performed by the engine's compressor section 14 (i.e. the LPC 102 and/or the HPC 104) as an energy dissipater. In particular and as will be described further below, it is proposed to adjust the position of the engine's VGM in order to increase the work performed by the compressor section 14 and accordingly provide additional reverse thrust capability for the propeller 29. For this purpose, the compressor section 14 (i.e. the LPC 102 and/or HPC 104) is coupled to the power turbine shaft 24.

As used herein, the term "position" of the VGM refers to the VGM opening angle of the VGM with respect to the central axis A of the engine 10. It should be understood that the position of the VGM is relative and may range from a position where the VGM is at a maximum opening angle to a position where the VGM is at a minimum opening angle (and any suitable intermediate positions in between), with the maximum and minimum opening angles being set according to engine design limitations.

In the embodiment of FIG. 1B, the LPC 102 is mechanically linked to the power turbine shaft 24 via a connection 114 such that adjustment of the position of the VIGV(s) 110 causes the work performed by the LPC 102 to increase, which in turn results in an increase in reverse thrust. The connection 114 is illustratively a rigid and permanent connection between the LPC 102 and the power turbine shaft 24. It should however be understood that, in other embodiments, a clutch may be used to temporarily couple the power turbine shaft 24 to the engine's compressor section 14. For example, as illustrated in FIG. 10, a clutch 115 may be provided between the power turbine shaft 24, which connects the RGB 26 and the LPT 106, and the HP shaft 116, which connects the HPC 104 and the HPT 108. In this case, adjustment of the VGV(s) 112 would cause the work performed by the HPC 104 to increase, which would in turn result in an increase in reverse thrust.

Figure 2A:
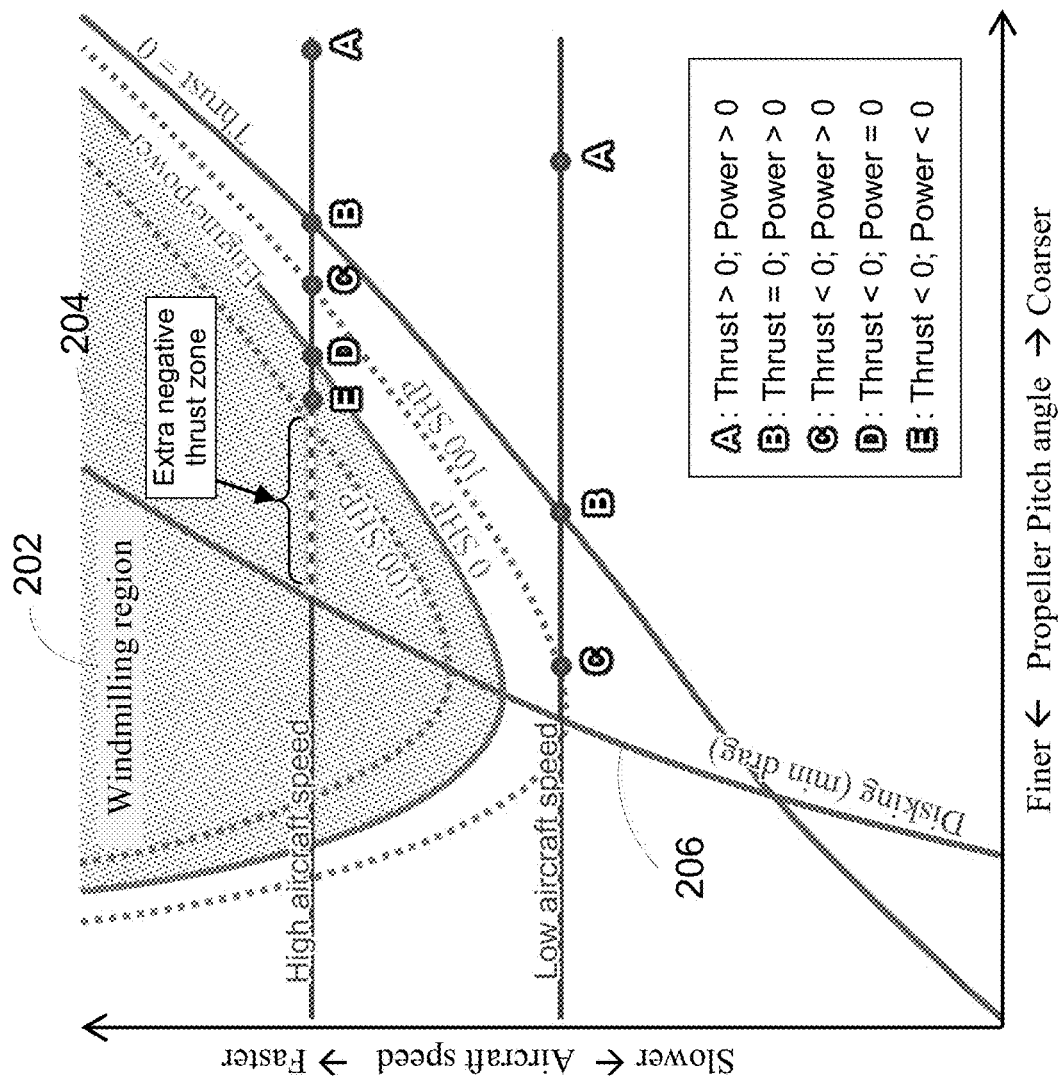
FIG. 2A is a graphical illustration of a propeller map showing the operating points of the propeller of FIG. 1A at constant altitude and constant reference rotational speed for high and low aircraft speeds, in accordance with an illustrative embodiment.
Figure 2B:
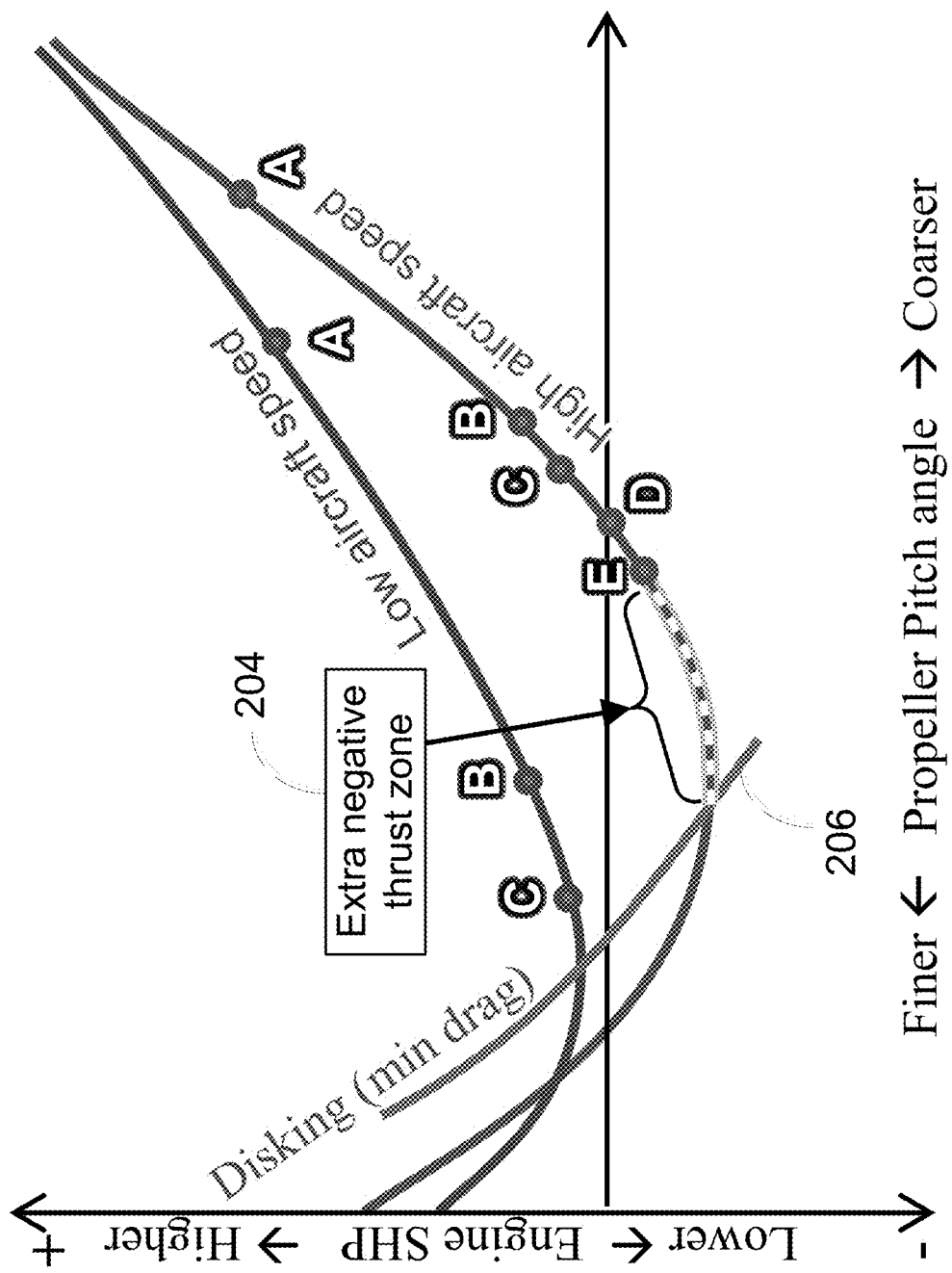
FIG. 2B is a graphical illustration of the propeller map of FIG. 2A expressed in engine shaft horsepower (SHP), in accordance with an illustrative embodiment.
Figure 2C:
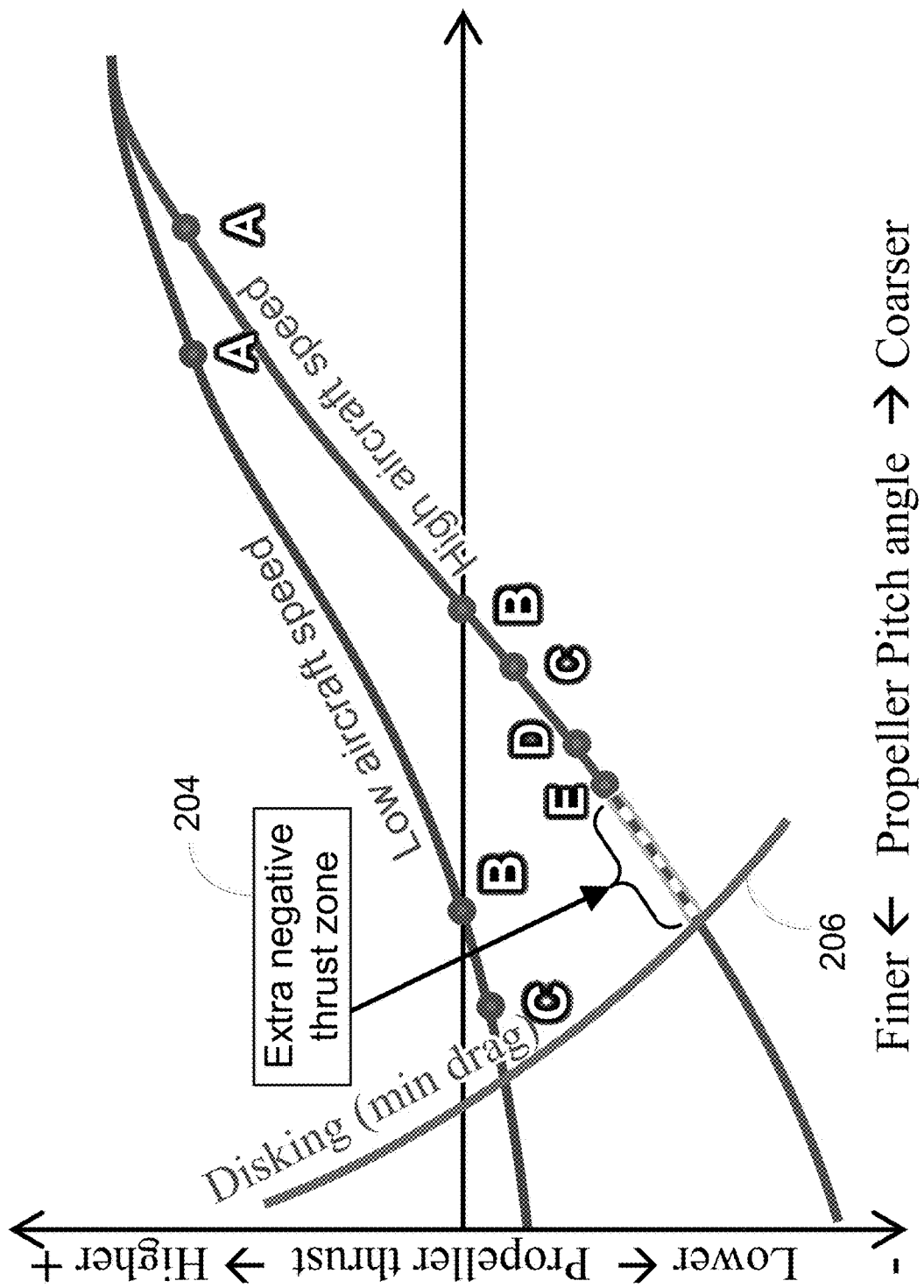
FIG. 2C is a graphical illustration of the propeller map of FIG. 2A expressed in propeller thrust, in accordance with an illustrative embodiment.
Figure 2D:
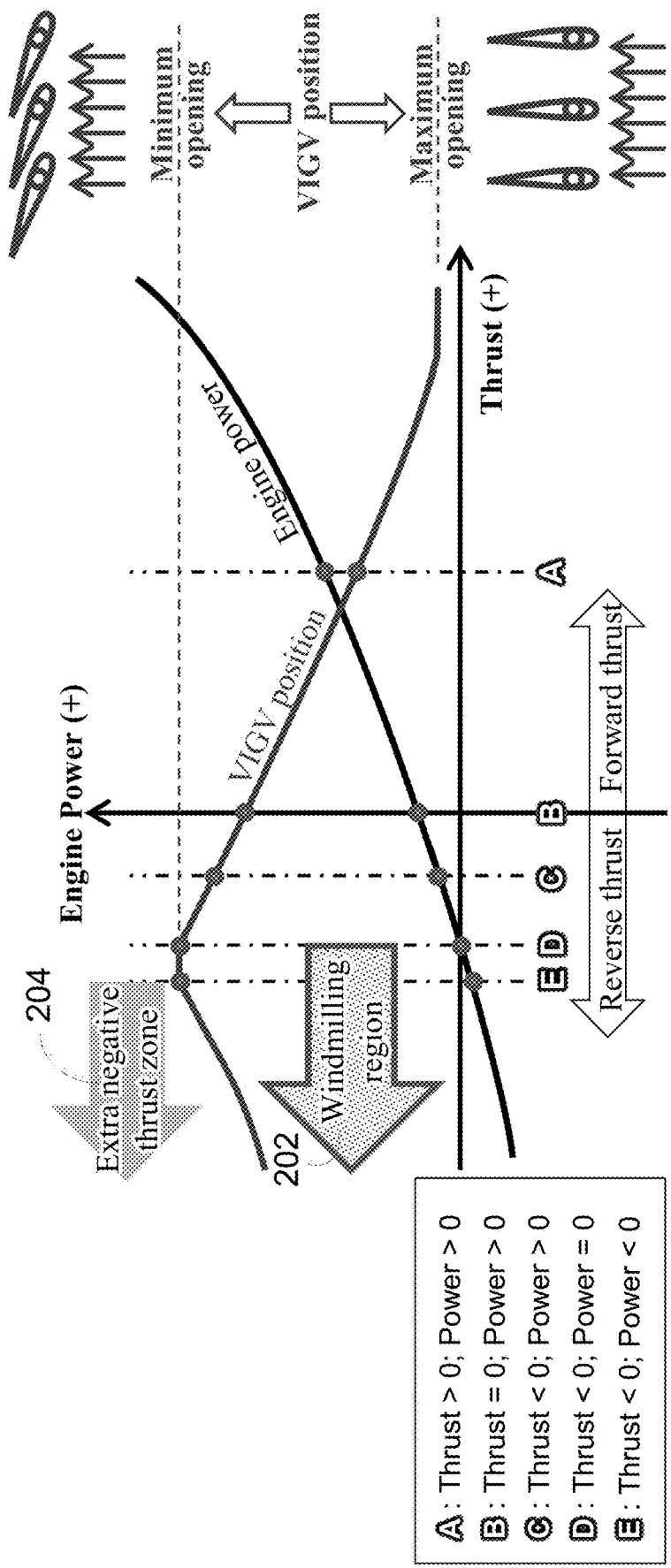
FIG. 2D is a graphical illustration of adjustment of the position of the Variable Inlet Guide Vanes (VIGVs) of the engine of FIG. 1A along the operating points of FIG. 2A, in accordance with an illustrative embodiment.

FIG. 2A, FIG. 2B, and FIG. 2C are graphical illustrations of example maps showing different operating points (A to E) applied to an aircraft powered by a rotor, such as the propeller 29 of FIG. 1A. In particular, FIG. 2A shows the operating points of the propeller at constant altitude and constant reference rotational speed for high and low aircraft speeds, FIG. 2B shows the map of FIG. 2A expressed in engine shaft horsepower (SHP), and FIG. 2C shows the map of FIG. 2A expressed in propeller thrust. FIG. 2D further illustrates the adjustment of the position of the engine's VGM (e.g., the VIGVs 110), along the operating points A to E. It should be understood that, while FIG. 2D illustrates adjustment of the VIGVs 110, the VGVs 112 may be similarly adjusted, as discussed herein. Also, while FIG. 2A, FIG. 2B, FIG. 2C, and FIG. 2D illustrate operating points for an aircraft having a turboprop engine (such as the engine 10 of FIG. 1A), it should be understood that similar operating points may apply for an aircraft having a turbofan engine and powered by a rotor comprising a fan. It should also be understood that, in some embodiments, the maps showing operating points of a variable pitch fan are similar to the maps showing operating points of a variable pitch propeller, and that, in some embodiments, the maps showing operating points of a fixed pitch fan are similar to the maps showing operating points of a fixed pitch propeller.

In other words, as indicated herein, the systems and methods described herein may be equally applied to a turboprop engine and to a turbofan engine. In the case of a variable pitch propeller or a variable pitch fan, the systems and methods described herein illustratively cause a decrease in the rotational speed of the rotor (i.e. the propeller or fan), which is counteracted by the reaction of the variable pitch controller, which adjusts (i.e. decreases) the blade angle (or blade pitch), thus causing an increase in reverse thrust for the propeller or fan. In the case of a fixed pitch propeller or a fixed pitch fan, the systems and methods described herein illustratively cause a decrease in the rotational speed of the rotor (i.e. the propeller or fan), which results in a decrease in the angle of attack (i.e. the relative angle between the blade chord and the relative airflow) of the propeller blade or fan blade, thus causing an increase of reverse thrust.

It should also be understood that, while the systems and methods described herein refer to providing in-flight reverse thrust for a propeller within windmilling, the systems and methods may also apply when the propeller 29 is not operating in a windmilling state. When the propeller 29 is not windmilling, the request for reverse thrust is increased in order to reduce the engine rotor (e.g., propeller) speed toward the windmilling speed of the engine 10. Continuing to increase the reverse thrust request can eventually cause the engine 10 to enter into the windmilling speed regime and thus cause the engine 10 to dissipate even more energy (where SHP<0). Moreover, in the case of a variable pitch propeller or a variable pitch fan, the systems and methods described herein could apply before entering into the windmilling regime, in case the minimum fuel flow of the engine 10 is so high that it prevents the engine 10 from having its power reduced to 0 SHP. This may occur when the aircraft speed is not sufficiently high to enter the windmilling state when setting the engine power to minimum.

Still referring to FIG. 2A, FIG. 2B, and FIG. 2C, and FIG. 2D, in normal powered flight, the engine 10 delivers power to the engine rotor (e.g. the propeller 29), which in turn converts the power into forward thrust (operating point A). In descent, the pilot may no longer need thrust since the pilot wishes for the aircraft to lose altitude. However, the engine 10 still needs to produce power in order to overcome propeller drag. The net thrust balance is thus null (operating point B). In case the pilot wants the aircraft to descend at a higher rate, the engine output power can be further reduced and the engine thrust will become negative, providing aerodynamic braking to the aircraft (operating point C). Further, once the engine output power reaches zero (operating point D), the propeller 29 enters a windmilling region 202 in which the propeller 29 is partially or entirely driven by the speed of the aircraft.

As will be discussed further below, for a turboprop engine such as engine 10, a pitch change mechanism (also referred to herein as a Pitch Controller Unit or PCU, not shown) automatically reduces the propeller pitch angle to maintain the propeller speed on its reference target (i.e. to operate the propeller 29 at the reference speed). The pitch change mechanism may take different forms, depending on the type of engine 10 and/or aircraft. In some embodiments, the pitch change mechanism is a single acting pitch change actuator and the propeller 29 incorporates a single acting piston. In other embodiments, the pitch change mechanism is a double acting pitch change actuator and the propeller 29 incorporates a double acting piston. Reverse thrust then continues to increase up to a predetermined limit (operating point E) defined by the maximum possible mechanical resistance that the engine 10 can offer to rotation of the propeller 29. In other words, the operating point E is based on propeller drag and rotational resistance of the engine 10.

In order to overcome this reverse thrust limitation, it is proposed herein to provide additional negative (or reverse) thrust capability (i.e. beyond operating point E) for the engine 10 by adjusting the engine's variable geometry mechanism (VGM). The resulting operating zone of the rotor (e.g., the propeller 29) is referred to herein as an "extra negative thrust zone" 204. In one embodiment, in order to maintain the propeller speed on its reference target, the extra negative thrust zone 204 extends up to (i.e. is limited by) a propeller disking angle 206 (i.e. minimum propeller drag at the reference rotational speed) and by the maximum rotational resistance that the engine 10 can offer to the propeller 29 through the compression work that can be performed by the LPC (reference 102 in FIG. 1B) and/or the HPC (reference 104 in FIG. 1C). It should however be understood that, in other embodiments, the extra negative thrust zone 204 may extend beyond the disking angle 206.

Figure 3:
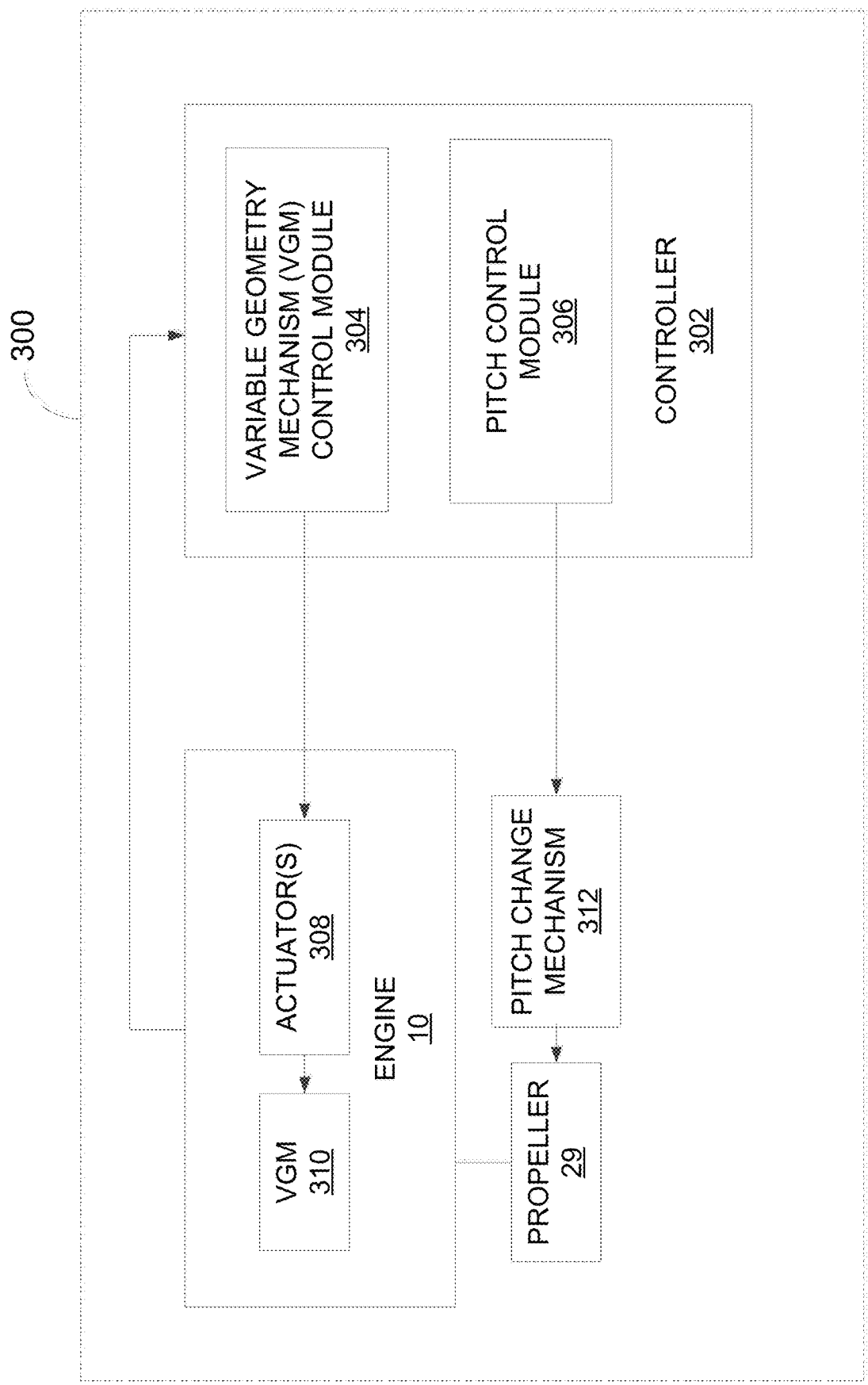
FIG. 3 is a block diagram of a control system for providing in-flight reverse thrust within windmilling, in accordance with an illustrative embodiment.

Referring now to FIG. 3, there is illustrated an example embodiment of a control system 300 used for providing in-flight reverse thrust within windmilling. While the system 300 is described herein with reference to the engine 10 (particularly to variable pitch propeller operation), it should be understood that this is for illustrative purposes only and that the system 300 may be applied to any other suitable engine, including, but not limited to, a turbofan engine.

The system 300 illustratively comprises a controller 302, which is coupled to the engine 10 and propeller 29. In one embodiment, the controller 302 comprises a VGM control module 304 and a pitch control module 306. It should however be understood that, in some embodiments, the pitch control module 306 may be provided separately from the controller 302. As will be discussed further below, the VGM control module 304 is configured to send one or more position control signals to one or more actuators 308 of the engine 10, which are configured to adjust (or modulate) the position of VGM 310 of the engine 10. As described above, the VGM 310 illustratively comprises one or more variable inlet guide vanes (VIGVs) (reference 110 in FIG. 1B). The pitch control module 306 is configured to send one or more pitch control signals to a pitch change mechanism 312 coupled to the propeller 29, as will also be discussed further below.

In operation, a request for an increase in negative (or reverse) thrust (also referred to herein as an "additional reverse thrust request") may be received at the controller 302 when the propeller 29 is windmilling (i.e. operating in the windmilling region, reference 202 in FIG. 2A). In one embodiment, the additional reverse thrust request may indicate the amount of additional reverse thrust that is desired. In another embodiment, the amount of additional reverse thrust is determined based on the power of the engine 10. The additional reverse thrust request may be received from a pilot or other operator of the aircraft, via a power lever (not shown) of the aircraft under control by the pilot or other operator. The position of the power lever is indicative of the type of thrust demanded by the power lever and may be obtained from at least one sensor associated with the power lever. Several power lever positions can be selected, including, in one embodiment, those for (1) maximum forward thrust (MAX FWD), which is typically used during takeoff; (2) flight idle (FLT IDLE), which may be used in flight during approach or during taxiing on the ground; (3) ground idle (GND IDLE), at which the propeller 120 is spinning, but providing very low thrust; (4) maximum reverse thrust (MAX REV), which is typically used at landing in order to slow down the aircraft. Intermediate positions between the abovementioned positions can also be selected.

Thus, in some embodiments, reverse thrust may be requested when the power lever is set to a position for requesting reverse thrust, for example by the pilot. By way of another example, the controller 302 may be configured to physically move the power lever via a servo motor to a position for requesting reverse thrust. In some embodiments, reverse thrust may be requested without movement of the power lever. In some embodiments, reverse thrust may be requested when any suitable mechanism (e.g., a push button) for requesting reverse thrust is actuated. In some embodiments, reverse thrust may be requested when a request to enable a mode for automated reverse thrust is received. Other embodiments may apply.

It is proposed herein to use, upon receipt of the additional reverse thrust request, the compression work performed by the engine's compression section (i.e. by the LPC, reference 102 in FIG. 1B, and/or by the HPC, reference 104 in FIG. 1B) as an energy dissipater. For this purpose, the controller 302 is configured to increase the compression work performed by the engine's compressor section (i.e. to increase the energy dissipated at the engine level) by commanding the VGM 310 (i.e. the VIGV(s) 110 and/or the VGV(s) 112) towards an open position. In particular, the VGM control module 304 outputs to the actuator(s) 308 position control signal(s) that comprise instructions for causing the position of the VGM 310 to be adjusted (via the actuator(s) 308) from a current (or first) position toward the desired (or second) position.

As illustrated in FIG. 2D, in one embodiment, when propeller 29 enters the windmilling region 202 prior to the adjustment of the position of the VGM 310 (e.g., of the VIGV(s) 110), the engine 10 is running at minimum power (operating point D), with the position of the VGM 310 being set at a minimum opening angle in order to limit the amount of engine mass flow at the LPC 102 and/or HPC 104. Therefore, when the propeller 29 enters the windmilling region 202, the term "first position" as used herein may refer to the minimum opening angle of the VGM 310. In other embodiments, when the propeller 29 is already operating within the windmilling region 202 and additional reverse thrust is required, the term "first position" may refer to a position where the opening angle of the VGM 310 is greater than the minimum opening angle, yet lower than the maximum opening angle. As shown in FIG. 2D, the position of the VGM 310 is then adjusted from the first position towards a second position in which the opening angle of the VGM 310 is greater than (i.e. above) the opening angle when the VGM 310 is in the first position. The second position (i.e. the angle at which the VGM is opened) may be determined based on the additional reverse thrust request (i.e. based on the requested increase in reverse thrust) or as a function of the power of the engine 10. In some embodiments, the second position may be set to the maximum opening angle.

Adjustment of the VGM 310 towards the second open position causes the compressor (i.e. the LPC 102 and/or the HPC 104) to increase its work, thus dissipating energy harvested by the propeller 29. As a result, because the propeller 29 is coupled to the compressor section of the engine via the propeller shaft 34 and the power turbine shaft 24 (i.e., the propeller shaft 34 being mechanically coupled to the power turbine shaft 24, which is in turn mechanically linked to the LPC 102 via the connection 114 or temporarily linked to the HPC 104 via a clutch 115, as discussed above with reference to FIG. 1B and FIG. 10), the increase in the amount of work performed by the LPC 102 causes the rotational speed of the propeller 29 to decrease. The decrease in propeller speed is detected by the controller 302, which as a result causes the propeller pitch angle to be adjusted (i.e. reduced) in order to bring the rotation speed of the propeller 29 toward the reference speed. As used herein, the term propeller "pitch angle" (also referred to as "blade angle") refers to the angle between the propeller blade and the rotational plane of the propeller 29.

The pitch control module 306 is indeed configured to respond to a change in propeller rotational speed from a reference speed by countering the change in propeller speed with a change in blade angle in order to maintain the speed of the propeller 29 at the reference speed. The reference speed may be set, for example in rotations per minute (rpm), via a cockpit control. The pitch control module 306 senses propeller speed and instructs the pitch change mechanism 312 to direct oil under pressure to the propeller 29 or to release (i.e. remove) oil from the propeller 29. The change in oil volume going to the propeller 29 changes the blade angle and modifies the propeller speed.

In particular, when the engine 10 is operating below the reference speed, the propeller 29 is said to be operating in an underspeed condition. The pitch control module 306 will instruct the pitch change mechanism 312 to meter oil flow to decrease propeller pitch and raise engine rpm. When the engine 10 is operating above the reference speed, the propeller 29 is said to be operating in an overspeed condition.

The pitch control module 306 will instruct the pitch change mechanism 312 to meter oil flow to increase propeller pitch and lower engine rpm. When the engine 10 is operating at the reference speed, the propeller 29 is said to be operating in an on-speed condition. The propeller blade angles are not changing. If something happens to unbalance the forces on the propeller 29, such as a change in aircraft speed and/or a change in engine power, or the reference speed is changed via the cockpit control, then an underspeed or overspeed condition results and the pitch control module 306 will react accordingly.

Still referring to FIG. 3, as a result of the increase in compression work and the decrease in propeller speed, the pitch control module 306 outputs to the pitch change mechanism 312 one or more pitch control signals that comprise instructions to decrease the pitch angle of the propeller 29 for maintaining the propeller rotation speed on its reference target. As a result, the pitch change mechanism 312 meters oil flow to decrease propeller pitch (and raise propeller rotational speed) and the reverse thrust then increases as a result.

Figure 4:
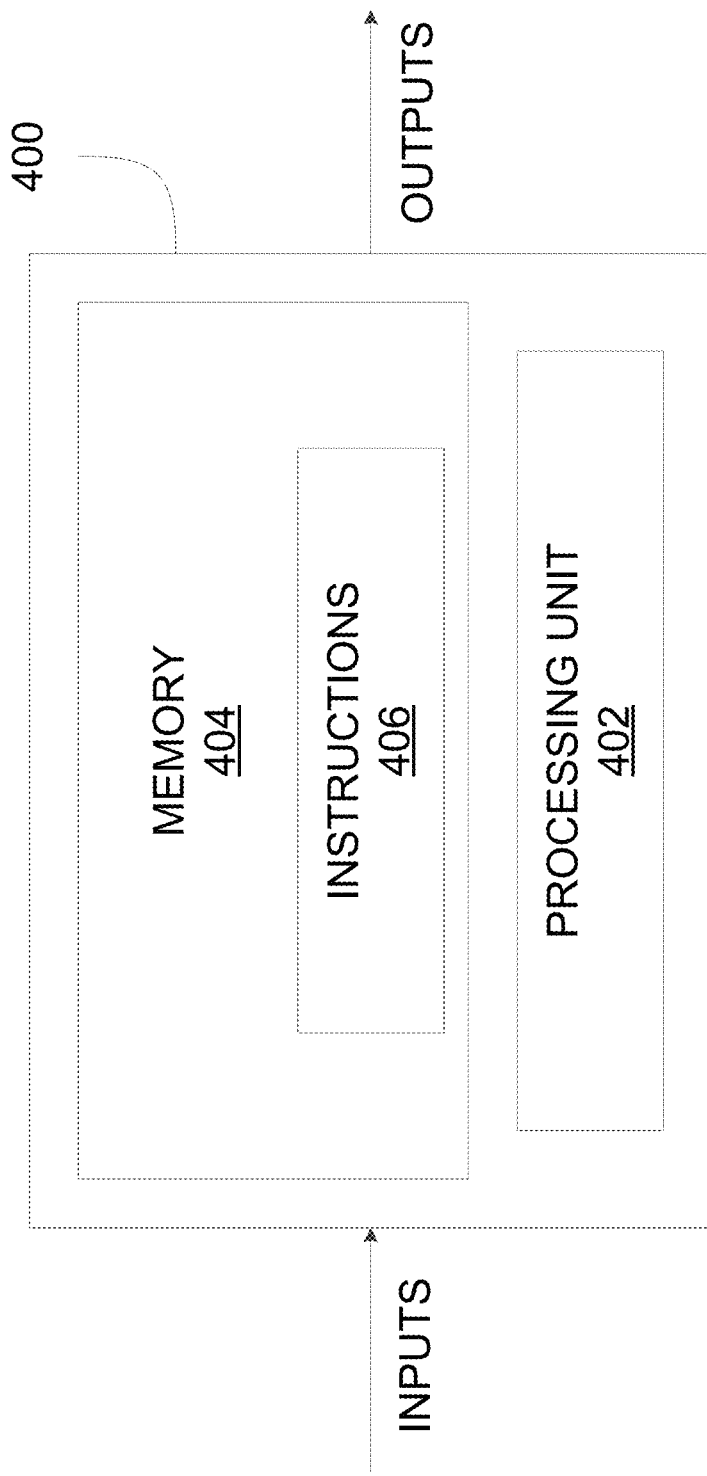
FIG. 4 is a block diagram of a computing device, in accordance with an illustrative embodiment.

FIG. 4 illustrates a schematic diagram of an example embodiment of a computing device 400 that may be used for implementing the controller 302 of FIG. 3. As depicted, the computing device 400 includes at least one processing unit 402 and memory 404. The memory 404 has stored therein computer-executable instructions 406. The processing unit 402 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof. In some embodiments, the computing device 400 is an engine computer. In some embodiments, the computing device 400 is an aircraft computer. In some embodiments, the computing device 400 forms part of the engine computer or the aircraft computer.

The memory 404 may comprise any suitable known or other machine-readable storage medium. The memory 404 may comprise non-transitory computer readable storage medium, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to computing device 400, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 404 may comprise any storage means (e.g., devices) suitable for retrievably storing machine-readable instructions 406 executable by processing unit 402.

The inputs to the computing device 400 (and accordingly to the controller 202) may come from the aircraft computer, the engine computer, the cockpit control, various engine/propeller/aircraft sensors, and the like. For example, a power lever position indicative of a request for additional reverse thrust may be received as an input to the computing device 400. The power lever position may be processed to enable the controller (reference 302 of FIG. 3). In other embodiments, the inputs may comprise an enable signal for the controller 302.

The outputs of the computing device 400 may be directed to the engine actuator(s) (reference 308 in FIG. 3) and to the pitch change mechanism (reference 312 in FIG. 3). For example, the outputs of the computing device 400 (and accordingly of the controller 202) may comprise oil metering signals sent to the pitch change mechanism 312 for adding or removing oil from the propeller 29 so as to change the pitch of the propeller 29. In other embodiments, the pitch change mechanism 312 effects an electronic control over blade angles and the computing device 400 (i.e. the controller 202) provides pitch control signals to the pitch change mechanism 312 that will vary propeller speed.

The instructions 406 may be implemented in a high level procedural or object oriented programming or scripting language, or a combination thereof, to communicate with or assist in the operation of a computer system, for example the controller 402. Alternatively, the instructions 406 may be implemented in assembly or machine language. The language may be a compiled or interpreted language. The instructions 406 may be readable by a general or special-purpose programmable computer.

Figure 5A:
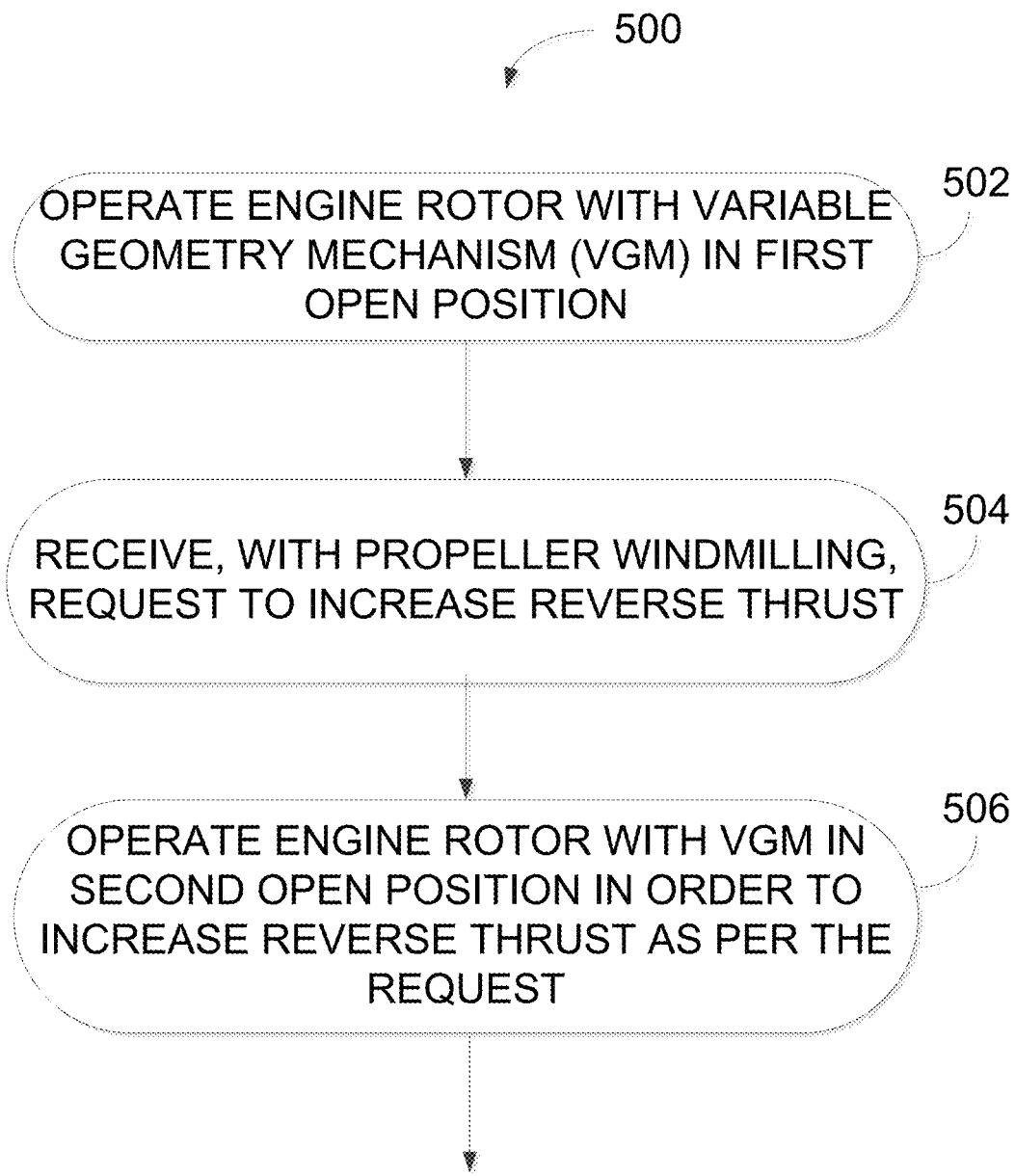
FIG. 5A is a flowchart of a method for providing in-flight reverse thrust within windmilling, in accordance with an illustrative embodiment.
Figure 5B:
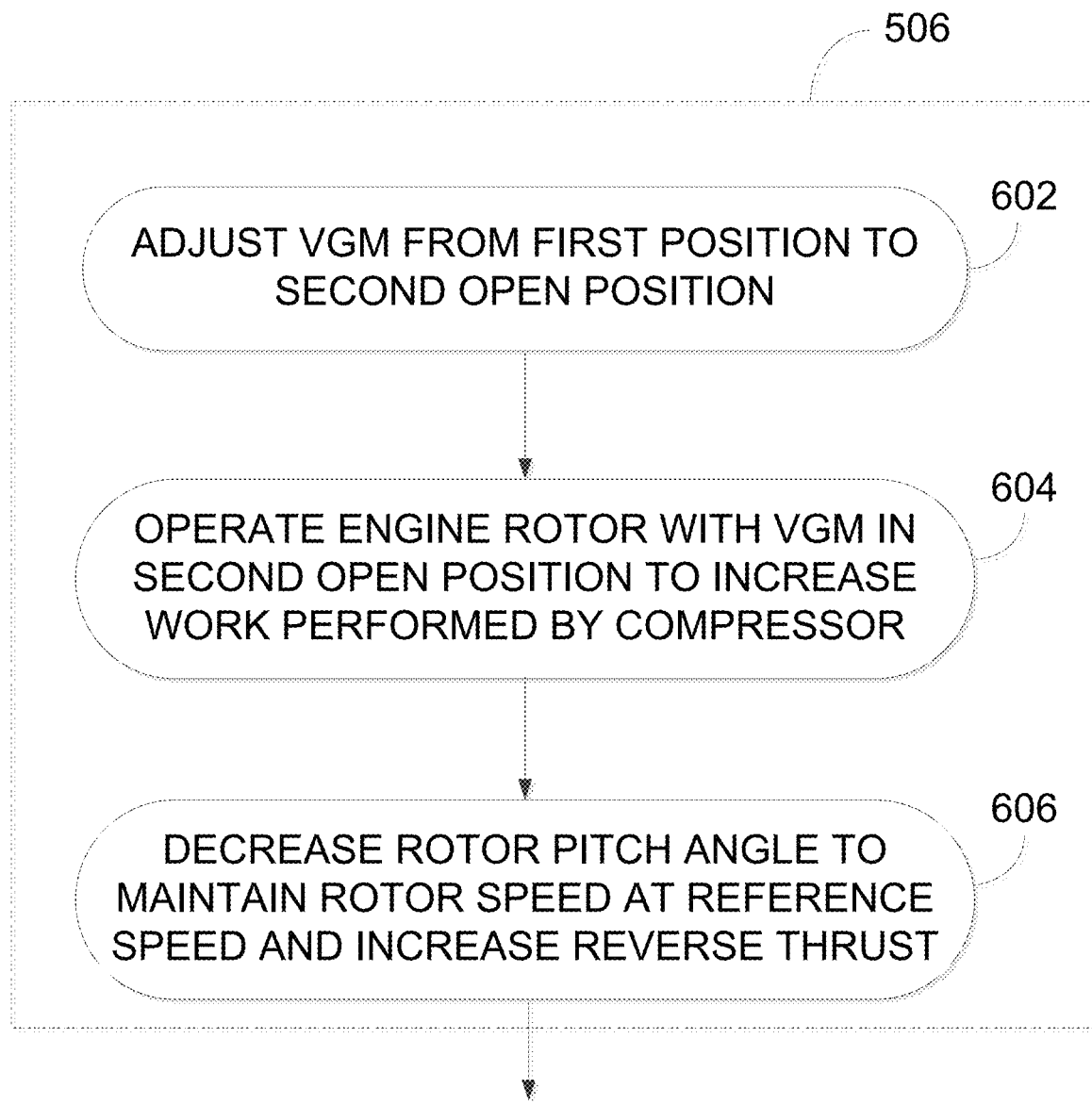
FIG. 5B is a flowchart of the step of FIG. 5A of operating a propeller with the engine's variable geometry in an open position in order to increase reverse thrust, in accordance with an illustrative embodiment.

Referring to FIG. 5A and FIG. 5B, there is illustrated a flowchart for an example embodiment of a method 500, as performed by the instructions 406 when executed by the processing unit 402 of the computing device 400 (i.e. of the controller 302). While the method 500 is described herein with reference to a turboprop engine, it should be understood that this is for illustrative purposes only and that the method 500 may be applied to any other suitable engine, including, but not limited to, a turbofan engine.

As previously discussed, during typical operation of a turboprop engine (such as the engine 10 of FIG. 1A), the power lever position is set at low power and descent of the aircraft is initiated. With the aircraft diving, propeller drag decreases and the power lever position reaches minimum power. This causes the pitch control module (reference 306 in FIG. 3) to decrease the propeller pitch angle to keep the propeller rotating at the reference speed. Reverse thrust and negative torque are then reached, however the reverse thrust is limited by the maximum possible mechanical resistance that the engine 10 can offer to rotation of the propeller 29 (i.e. by propeller drag).

The method 500 is used for providing in-flight reverse thrust for a propeller, such as propeller 29, within windmilling. As illustrated in FIG. 5A, at step 502, the engine rotor (e.g. the propeller) is operated with the VGM in a first position. In one embodiment, when in the first position, the VGM is already open. At step 504, with the propeller operating in a windmilling state, a request to increase reverse thrust is received. As discussed herein above, the request may be received via the power lever of the aircraft under control by the pilot or other operator. The request may indicate the amount of additional reverse thrust that is desired. At step 506, in order to increase the reverse thrust as per the request received at step 504, the engine rotor is operated with the VGM (i.e. the VIGV(s), reference 110 in FIG. 1B) in a second (i.e. more open) position, in which the opening angle of the VGM is greater than the opening angle of the VGM in the first position.

Specifically, as illustrated in FIG. 5B, step 506 comprises adjusting the VGM from the first position to the second position (step 602). The second position (i.e. the angle at which the VGM is opened) is determined based on the request received at step 504. When in the second position, the VGM is opened at a greater angle than when in the first position, as described herein above. At step 604, the rotor is then operated with the VGM in the second position in order to increase the amount of work performed by the engine's compressor section. The increase in compression work causes the engine rotor to decrease its rotational speed, as discussed herein above. As a result, the rotor (e.g. propeller) pitch angle is decreased at step 606 in order to maintain the rotor speed at the reference speed and accordingly cause the reverse thrust to increase. As discussed herein above, the additional reverse thrust that is provided by method 500 is limited by the rotor disking angle (i.e. the disking angle of the propeller or fan) and the maximum compression work performed by the engine's compressor section (i.e. by the LPC and/or HPC).

Embodiments of the method 500 may also be implemented by way of a non-transitory computer-readable storage medium having a computer program stored thereon. The computer program may comprise computer-readable instructions which cause a computer, or in some embodiments the processing unit 402 of the computing device 400, to operate in a specific and predefined manner to perform the steps of method 500.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

In one embodiment, using the systems and methods described herein provides an aircraft with additional aero braking capabilities, thus increasing its maneuverability and the plurality of possible landing approaches. For instance, the systems and methods described herein may, in some embodiments, allow an aircraft to perform a rapid descent on a short distance relative to the ground. In particular, in some embodiments, the increase in reverse thrust afforded by adjusting the position of the VIGVs 110 may allow for an aircraft descent over a shorter distance than using existing methods. In some embodiments, the systems and methods described herein may also allow to increase the descent rate, and accordingly the descent time, which may in turn allow to reduce flight time.

The systems and methods described herein may, in some embodiments, be used in conjunction with a propeller map dedicated for reverse thrust. This propeller map may be implemented into the controller (reference 302 in FIG. 3) to ensure that the reverse thrust operating point used for the engine is kept within a conservative aerodynamic stability envelope. In particular, the map may specify a stability limit (in terms of rotational speed, air speed, pitch angle) for the propeller and the controller 302 may prevent the engine 10 from reaching this limit. Using the dedicated reverse thrust map, the controller 302 may be able to determine which parameter to adjust in order to avoid propeller instability.

The systems and methods described herein may allow to reduce overall system complexity as the need for additional engine hardware, such as a mechanical brake coupled to the propeller, which may be used in existing methods to increase reverse thrust for an aircraft engine is alleviated.

While the systems and methods described herein refer to increasing reverse thrust, it should be understood that the systems and methods described herein may also be used to conversely achieve a diminution of the compression work performed by the engine's compressor section, and thus achieve a reduction of reverse thrust, by commanding the engine's VGM (e.g., the VIGV(s) 110) towards a more closed (rather than more open) position, by reducing the opening angle of the VGM.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for providing in-flight reverse thrust for an aircraft, the aircraft comprising an engine having a rotor, a compressor mechanically coupled to the rotor, and a variable geometry mechanism provided upstream of the compressor and configured to modulate an amount of compression work performed by the compressor, the variable geometry mechanism being separate from the rotor, the method comprising:
 operating the rotor with the variable geometry mechanism in a first position;
 receiving a request to increase reverse thrust for the rotor with the rotor operating in a windmilling state;
 in response to the request, adjusting the variable geometry mechanism from the first position towards a second position, the variable geometry mechanism having a greater opening angle in the second position than in the first position;
 operating the rotor with the variable geometry mechanism in the second position for causing an increase in the amount of compression work performed by the compressor and an increase in reverse thrust for the rotor, the rotor being operated with the variable geometry mechanism in the second position for causing a decrease in a rotational speed of the rotor as a result of the increase in the amount of compression work performed by the compressor; and
 in response to the decrease in the rotational speed of the rotor, decreasing a pitch angle of the rotor for increasing the rotational speed of the rotor toward a reference speed, the decrease in the pitch angle resulting in the increase in reverse thrust.

2. The method of claim 1, wherein adjusting the variable geometry mechanism comprises outputting one or more position control signals to one or more actuators coupled to the variable geometry mechanism, the one or more position control signals comprising instructions for the one or more actuators to adjust the variable geometry mechanism to the second position.

3. The method of claim 1, wherein decreasing the pitch angle of the rotor comprises outputting one or more pitch control signals to a pitch change mechanism coupled to the rotor, the one or more pitch control signals comprising instructions for the pitch change mechanism to decrease the pitch angle of the rotor.

4. The method of claim 1, wherein adjusting the variable geometry mechanism comprises adjusting one or more variable inlet guide vanes provided upstream of a low pressure compressor of the engine.

5. The method of claim 1, wherein adjusting the variable geometry mechanism comprises adjusting one or more variable guide vanes provided upstream of a high pressure compressor of the engine.

6. The method of claim 1, wherein the received request is indicative of a requested amount of reverse thrust increase, the method further comprising determining the second position based on the requested amount of reverse thrust increase.

7. The method of claim 1, wherein the method comprises operating the rotor comprising a variable pitch propeller.

8. The method of claim 1, wherein the method comprises operating the rotor comprising a fixed pitch propeller.

9. The method of claim 1, wherein the method comprises operating the rotor comprising a variable pitch fan.

10. The method of claim 1, wherein the method comprises operating the rotor comprising a fixed pitch fan.

11. A system for providing in-flight reverse thrust for an aircraft, the aircraft comprising an engine having a rotor, a compressor mechanically coupled to the rotor, and a variable geometry mechanism provided upstream of the compressor and configured to modulate an amount of compression work performed by the compressor, the variable geometry mechanism being separate from the rotor, the system comprising:
   at least one processing unit; and
   at least one non-transitory computer-readable memory having stored thereon program instructions executable by the processing unit for:
      operating the rotor with the variable geometry mechanism in a first position;
      receiving a request to increase reverse thrust for the rotor with the rotor operating in a windmilling state;
      in response to the request, adjusting the variable geometry mechanism from the first position towards a second position, the variable geometry mechanism having a greater opening angle in the second position than in the first position;
      operating the rotor with the variable geometry mechanism in the second position for causing an increase in the amount of compression work performed by the compressor and an increase in reverse thrust for the rotor, the rotor being operated with the variable geometry mechanism in the second position for causing a decrease in a rotational speed of the rotor as a result of the increase in the amount of compression work performed by the compressor; and
      in response to the decrease in the rotational speed of the rotor, decreasing a pitch angle of the rotor for increasing the rotational speed of the rotor toward a reference speed, the decrease in the pitch angle resulting in the increase in reverse thrust.

12. The system of claim 11, wherein the instructions are executable by the processing unit for adjusting the variable geometry mechanism comprising outputting one or more position control signals to one or more actuators coupled to the variable geometry mechanism, the one or more position control signals comprising instructions for the one or more actuators to adjust the variable geometry mechanism to the second position.

13. The system of claim 11, wherein the instructions are executable by the processing unit for decreasing the pitch angle of the rotor comprising outputting one or more pitch control signals to a pitch change mechanism coupled to the rotor, the one or more pitch control signals comprising instructions for the pitch change mechanism to decrease the pitch angle of the rotor.

14. The system of claim 11, wherein the instructions are executable by the processing unit for adjusting the variable geometry mechanism comprising adjusting one or more variable inlet guide vanes provided upstream of a low pressure compressor of the engine.

15. The system of claim 11, wherein the instructions are executable by the processing unit for adjusting the variable geometry mechanism comprising adjusting one or more variable guide vanes provided upstream of a high pressure compressor of the engine.

16. The system of claim 11, wherein the instructions are executable by the processing unit for receiving the request indicative of a requested amount of reverse thrust increase, the method further comprising determining the second position based on the requested amount of reverse thrust increase.

* * * * *